United States Patent [19]
Epstein et al.

[11] 3,877,362
[45] Apr. 15, 1975

[54] METHOD AND MACHINE FOR REMOVING SHELLS FROM HARD COOKED EGGS

[75] Inventors: Jacob J. Epstein; Lawrence R. York, both of Topeka, Kans.

[73] Assignee: Seymour Foods, Inc., Topeka, Kans.

[22] Filed: Mar. 20, 1973

[21] Appl. No.: 342,968

[52] U.S. Cl. .................. 99/570; 99/568; 99/570; 99/581; 99/582; 426/299; 426/300
[51] Int. Cl. .......................................... A47j 43/00
[58] Field of Search ............. 99/460, 461, 464, 579, 99/540, 567–571, 577, 581, 582, 585; 426/298–301

[56] References Cited
UNITED STATES PATENTS

| | | | |
|---|---|---|---|
| 1,678,098 | 7/1928 | Bailey | 99/577 X |
| 2,229,349 | 1/1941 | Sigler | 99/582 X |
| 2,443,188 | 6/1948 | Hodson | 426/299 |
| 2,713,881 | 7/1955 | Shideler | 426/299 |
| 2,776,690 | 1/1957 | Warren | 99/585 |
| 2,954,810 | 10/1960 | Bond | 99/577 X |
| 3,303,864 | 2/1967 | Bailey, Jr. | 99/577 X |

Primary Examiner—John Petrakes
Attorney, Agent, or Firm—Guy A. Greenawalt

[57] ABSTRACT

An apparatus for removing the shells from hard cooked eggs which comprises a single line roller-type conveyor mounted in an upright frame with the top run thereof in horizontally disposed relation and having pockets formed between the rollers for receiving the eggs with the long axis transverse of the conveyor path and arranged to rotate the eggs while advancing them beneath a series of spring pressed pad or plate members arranged in spaced groups in a plane above the conveyor run with the first one or group thereof having, in the bottom face, a rib formation which extends in the direction of advance of the conveyor and which has a sufficient edge for cutting or breaking the shells near the transverse center while the eggs are advanced and rotated about their long axis, and with nozzles discharging liquid, depending from a liquid supply manifold, in the spaces between the pressure applying pad assemblies so that pressure is applied to the eggs by the pressure applying pads and the eggs are flushed with a fluid at flushing stations resulting in the shell portions being separated from the egg bodies and forced toward the sides of the conveyor causing the shell portions to drop onto a shell collecting conveyor at a lower level while the flushing liquid is funneled into an open top storage or supply tank at the bottom of the supporting frame with the liquid passing through a filter for subsequent recycling.

28 Claims, 13 Drawing Figures

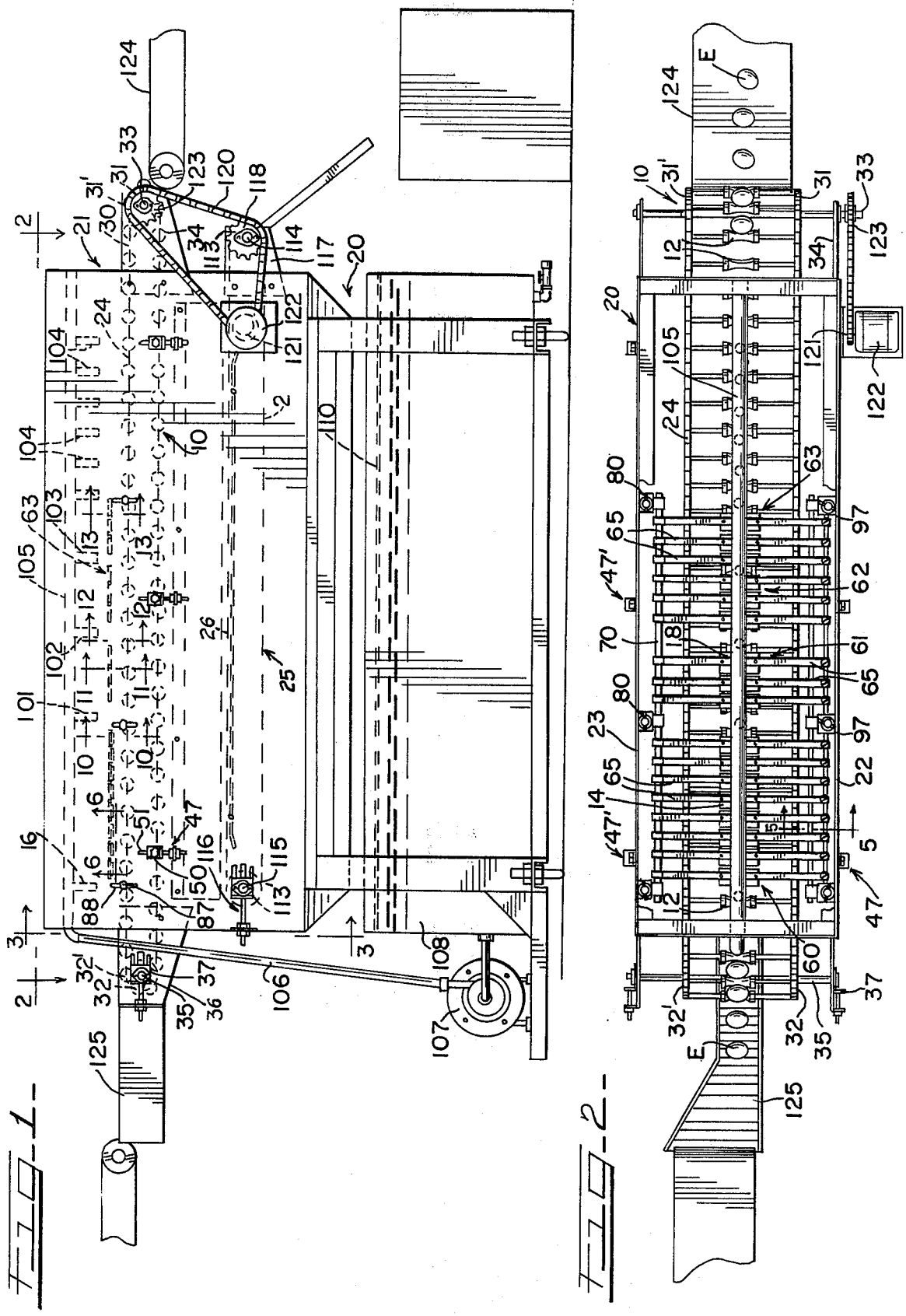

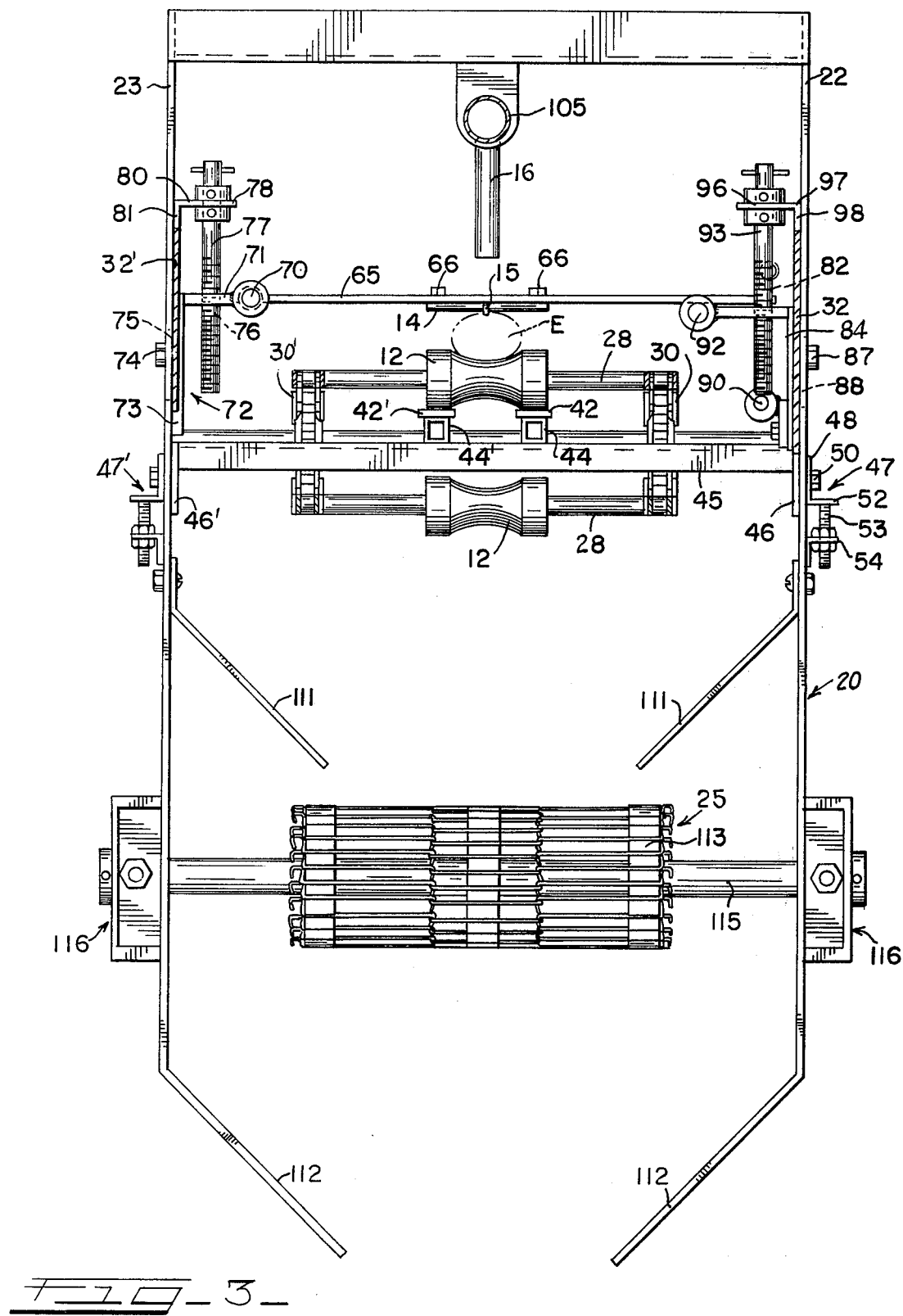
FIG_3_

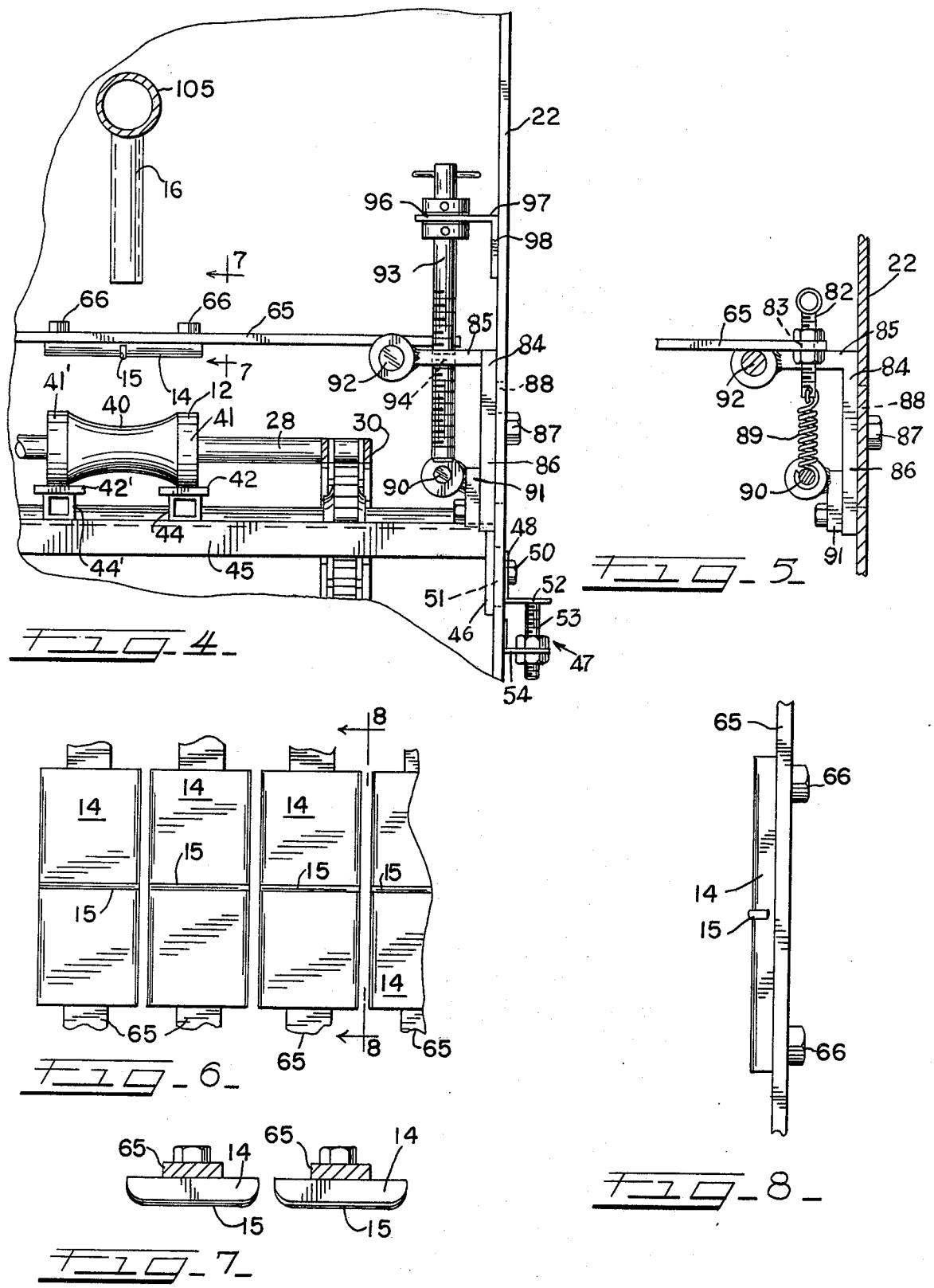

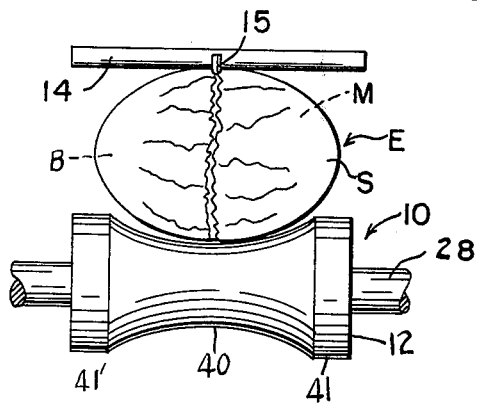
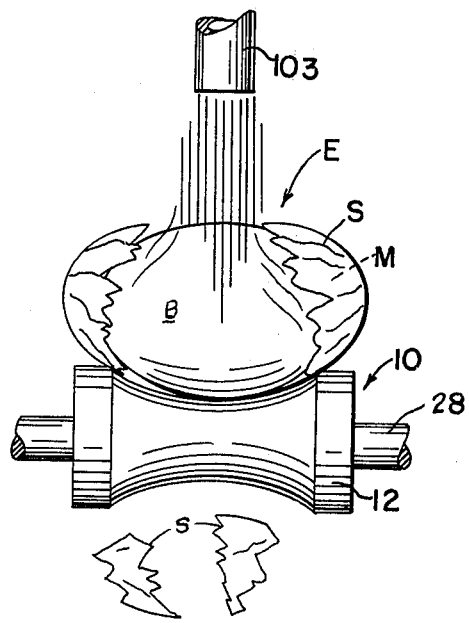
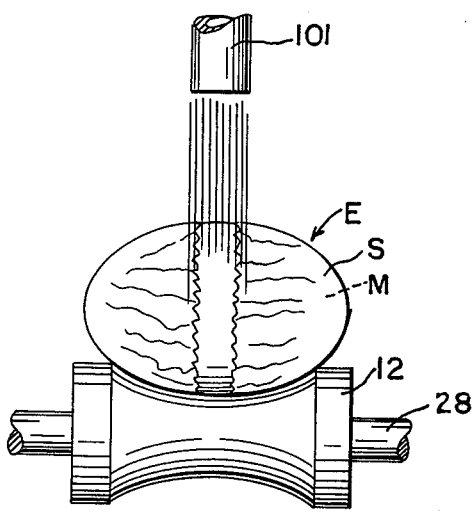
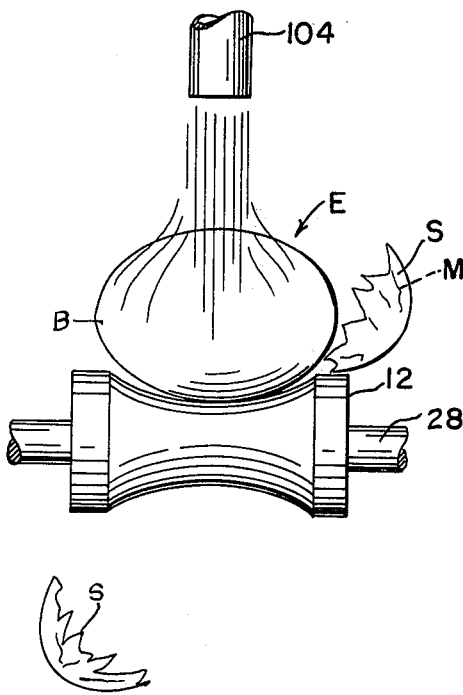
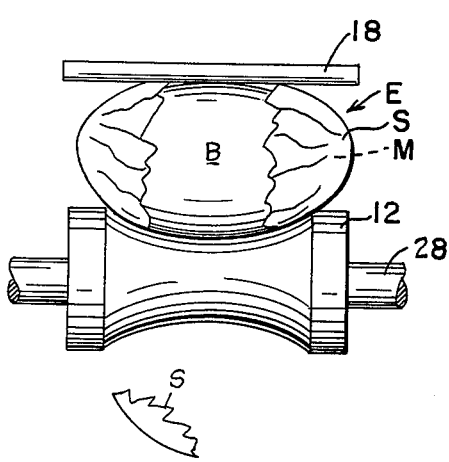

METHOD AND MACHINE FOR REMOVING SHELLS FROM HARD COOKED EGGS

This invention relates to the handling of hard cooked eggs and is more particularly concerned with improvements in a method and apparatus for removing the shells from the eggs in a rapid and efficient manner under conditions which meet with sanitation requirements.

In the handling of eggs heretofore, removal of the shells has generally involved a manual operation, which is a time consuming and expensive procedure. Some efforts have been made to develop machinery for mechanically removing egg shells but the machines proposed have not been acceptable commercially to any substantial degree, for one reason or another. Generally, the cost of the machine has been too high or the efficiency too low. No fully satisfactory equipment for this purpose has been available for use by food processors, hotels or the like which have large quantity hard cooked egg requirements.

It is a general object of the invention to provide a method and apparatus for shelling hard cooked eggs in a simple and economical manner, which is capable of relatively high volume production and which has adequate provision for maintaining the eggs in a sanitary condition throughout the operation.

It is a more specific object of the invention to provide a method and apparatus for shelling hard cooked eggs which takes advantage of the resiliency of the egg bodies in fracturing the shells and in separating the shells into portions which are readily removed by a rolling action, under relatively light pressure, and flushing with a suitable liquid.

Another object of the invention is to provide a method and apparatus for removing shells from hard cooked eggs wherein the eggs are rotated on a traveling conveyor and passed beneath spring pressed plates or pads equipped with a shell fracturing element operative on the center portion of successive eggs as they are rotated about their longitudinal axes without regard for the positioning of the large or small end and rolled along the plate surface so as to sever the shells into portions which permit easy removal of the shells and the accompanying membranes by subsequent rolling and flushing with a suitable liquid.

A still further object of the invention is to provide a method and apparatus for removing shells from hard cooked eggs wherein the eggs are advanced on a roller-type conveyor which rotates the eggs and rolls them beneath a series of pressure applying plates having a shell fracturing or cutting element for separating the shells and accompanying membrane and permitting the shell portions to move outwardly towards the ends of the eggs upon subsequent application of sufficient pressure to elongate the egg bodies somewhat and cause the egg shell portions to be freed from the surface of the egg bodies.

Another object of the invention is to provide an apparatus for removing shells from hard cooked eggs wherein the eggs are received and rolled about their longitudinal axis on a conveyor which advances the eggs beneath a series of pressure applying pad members having an associated shell cutting means for separating the shell of each egg into at least two portions so as to enable subsequent rolling and pressure applying action to push the shell portions outwardly towards the ends of the eggs and permit collecting of the egg shell portions on a shell collecting conveyor traveling beneath the egg carrying conveyor.

These and other objects and advantages of the invention will be apparent from a consideration of the egg shelling method and machine which is shown by way of illustration in the accompanying drawings wherein:

FIG. 1 is a side elevation of a machine for shelling hard cooked eggs which incorporates therein the principal features of the invention;

FIG. 2 is a plan view of the machine of FIG. 1;

FIG. 3 is a partial cross section, to an enlarged scale, the view being taken on the line 3—3 of FIG. 1;

FIG. 4 is a portion of FIG. 3 to a larger scale and with certain elements omitted;

FIG. 5 is a fragmentary sectional view taken on the line 5—5 of FIG. 2, to a larger scale;

FIG. 6 is a view taken on the line 6—6 of FIG. 1, to a larger scale, the view showing the bottom face of the pressure applying plate members at the entrance end of the machine;

FIG. 7 is a view taken on the line 7—7 of FIG. 4, to a larger scale;

FIG. 8 is a view taken on the line 8—8 of FIG. 6, to a larger scale; and

FIGS. 9 to 13 are partially schematic views illustrating the sequence of operations in breaking and separating the shell portions from a hard cooked egg which constitutes the basic steps in the method of the present invention and which are carried out by the machine illustrated in FIG. 1, the views corresponding generally to cross sections taken on the lines 3—3; 10—10; 11—11; 12—12 and 13—13, respectively.

In the handling of hard cooked eggs which are employed in various ways in food preparation, it is generally recognized that the removal of the shells and the accompanying membrane which encloses the egg bodies or the edible contents of the eggs will be more readily accomplished if the eggs supplied before processing are not freshly laid but aged somewhat, generally about a week. When processed, the membranes which are initially rather tough and tend to cling rather tenaciously to the egg bodies will be fractured easily and cling to the egg shells so that removal of the shells will take with them the undesirable membranes leaving the egg bodies intact, if handled with a degree of care. The egg bodies are resilient and may be deformed to a substantial degree without damage, recovering their normal shape when pressure is removed. These characteristics are taken advantage of in the method of removing the shells which is illustrated particularly in FIGS. 9 to 13 of the drawings.

As shown in FIG. 9, each egg E is supported in a pocket of a roller type conveyor 10 wherein the rollers 12 are arranged with their axes extending transversely and rotated so as to rotate each egg about its longitudinal axis as the conveyor 19 is advanced beneath an assembly of pressure applying pad or plate members 14. Certain of the initial plate members 14, adjacent the entrance end of the machine, are equipped with a shell cutting or fracturing rib formation 15 which fractures or crushes the shell S on a circumferential line as the egg E is rotated and advanced by the conveyor 10. Sufficient pressure is applied to the egg E to elongate the resilient egg body B with the result that the shell portions, as shown in FIGS. 10 and 11, are pushed out towards the ends of the egg. Successive eggs are advanced initially to a first flushing nozzle 16 where a liquid, for example, water is flushed onto the egg surface while it is rotated, thereby wetting the shell and the connecting membrane M. The egg is then advanced by the conveyor 10 and rotated under the first assembly of pressure applying pads 14 where the initial shell crushing occurs and the shell is split due to the fracturing rib 15. The conveyor then advances the egg beneath a succession of spaced groups or assemblies of smooth surface friction plates or pad members 18, with liquid-flushing nozzles in the spaces between the groups, and the pad members 18 apply pressure and cause the egg body B to elongate and force the shell portions outwardly of the ends of the egg while further fracturing the shell, portions of which drop off or are flushed off by the action of the flushing nozzles. The last shell portions generally fall loose over the sides of the conveyor 10. A final flushing of the rotating eggs as they advance past the last group of pressure pads 18 insures that any shell portions which may still cling to the surface of the egg body will be washed off. The shelling operation is completed in the machine with the shell fragments dropping onto a collecting conveyor and the eggs being discharged at the end of the top run of the egg carrying conveyor 10.

The apparatus which is illustrated comprises a supporting frame 20 (FIGS. 1, 2 and 3) having a top section 21 which includes two parallel, laterally spaced, upstanding side plate members 22 and 23 with suitable connecting members forming an open ended, open top housing in which there is mounted an upper conveyor 10 having an egg carrying top run 25 and a shell collecting lower conveyor 25 having its top run 26 in generally parallel, vertically spaced, horizontally disposed relation to the top run 24 of the conveyor 10. The top conveyor 10 comprises a series of rollers 12 mounted on cross shafts or rods 28 which have opposite ends journaled in side chains 30, 30', the latter carried on pairs of end sprockets 31, 31' and 32, 32'. The sprockets 31, 31' are carried on a cross shaft 33 which is mounted in suitable end bearings in a bracket support 34 extending at the discharge end of the frame top section 21. Sprockets 32, 32' are carried on a cross shaft 35 which is journaled in a bracket support 36 at the entrance end of the frame top section 21 and provided with a tension mechanism 37 of conventional construction.

The conveyor rollers 12 (FIGS. 1, 3 and 9 to 13) are formed from cylindrical sections of plastic, wood, metal or any other suitable material and are each mounted on a supporting cross bar 28. The rollers have a peripheral contour which is curved so as to form a recess 40 in the surface, with the peripheral curvature being concave and complementary to the exterior curvature of an egg of average size. The peripheral recess 40 is provided for co-operation with like recesses 40 in adjoining rollers 12 in forming pockets in which eggs are supported. A cylindrical band or section is provided at opposite ends of each of the rollers 12 constituting tracks 41 and 41' for rotating the rollers 12 as hereinafter described. The rollers 12 are mounted in spaced relation on the conveyor 10 with the spacing between each roller and the adjacent roller being such that the peripheral recesses 40 co-operate in forming a pocket for accommodating an egg with its long axis extending transversely of the path of the conveyor. Cross rods 28 are journaled at their ends in the chains 30, 30' which constitute the traveling support members of the conveyor 10 and the track forming roller end portions 41 and 41' of each of the rollers 12, when traveling along the upper run 24 of the conveyor, engage with friction pads 42, 42' on rails 44 and 44' which extend longitudinally along the frame section 21 beneath the conveyor run 24 and are supported on cross frame members 45. The cross frame members 45 are spaced along the length of the frame section 21 and extend between vertically disposed bracket plates 46 and 46' which are adjustably mounted on the side frame plates 22, 23 by means of longitudinally spaced adjustment assemblies 47 and 47' (FIGS. 1, 3 and 4). Each adjustment assembly 47 comprises an angle bracket 48 which is connected with the bracket plate 46 by a bolt 50 extending through a vertical slot 51 in the associated side plate. On leg 52 of each bracket member 48 extends outwardly from the associated side plate and rests on the top of an adjustment screw 53 which extends upwardly from an angle bracket 54 which is secured on the outer face of the frame side plate. The adjustment assemblies 47' are of the same construction.

The pads or plate members are arranged in spaced groups or assemblies 60, 61, 62 and 63 (FIGS. 1 and 2) and are adjustably positioned in a horizontal plane immediately above the top run 24 of the conveyor 10. In the form of the machine shown, the pad assemblies extend from a point near the entrance end of the conveyor run 24 to a point some distance beyond the middle of the top conveyor run. Each of the four pad or plate assemblies 60, 61, 62 and 63 (FIGS. 1, 2 and 3) comprises a plurality of pad members arranged in side-by-side, generally coplanar relation. The first assembly 60, which is adjacent to the entrance end of the conveyor 10, comprises a series of generally rectangular plate members 14 (FIGS. 6, 7 and 8) of identical construction, each of which is mounted on a cross bar or cross strap 65 (FIG. 3), with the plate member 14 being secured to the strap by bolts 66 or any other suitable fastening means. The plate supporting bars or straps 65 are mounted in parallel, spaced relation, above conveyor run 24, so as to bring the plate members 14 in the assembly in edge-to-edge, confronting and slightly spaced relation. Each of the plate members 14 is of generally rectangular shape and formed of a suitable material with side edges rounded as shown in FIGS. 6 and 7. A shell fracturing element 15 is mounted on the bottom face of each plate which may be in the form of a wire or a plastic covered cord and extends approximately along the middle of the plate and in the direction of travel of the conveyor 10, and which is secured on the pad surface by suitable fastening means. The wire or cord 15 forms a downwardly protruding ridge on the bottom face of the plate member 14 with a bottom edge for contacting the egg surface which will fracture the egg shell without appreciably cutting into the egg body as the egg is rolled across the plate.

The pad or plate carrying bars 65 each support a single plate member 14 or 18 and are each pivotally mounted at the one end on a longitudinally extending support bar or rod 70 (FIGS. 2 and 3) for swinging movement in a vertical plane extending transversely of the conveyor run 24. The support rod 70 is mounted on the edges of the horizontally disposed legs 71 of longitudinally spaced angle brackets 72. Each angle bracket 72 has a vertically disposed leg 73 mounted on the inside face of the vertically extending associated side frame plate 23 by means of a bolt 74 which extends in a vertically disposed slot 75 in the frame plate, making adjustment in a vertical direction possible. The inwardly directed, horizontally disposed leg 71 of the bracket 72 is provided with a threaded aperture 76 for receiving the threaded shank portion of an adjusting screw or bolt 77 which is supported for axial rotation at 78 in the outwardly extending leg 80 of a supporting bracket 81 fastened on the associated side frame plate and permitting the adjusting screw or bolt 77 to be turned so as to raise and lower the bracket 72 and consequently raises and lowers support rod 70. At the other end each of the cross bars 65 is provided with an anchor bolt 82 (FIGS. 3 and 5) which extends vertically through an aperture 83 in the end of the bar and is vertically adjustable by means of a pair of clamp nuts thereon. A series of longitudinally spaced angle brackets 84 are mounted on the frame side plate 22, each having a horizontally disposed leg 85 and with the latter mounted for vertical adjustment on the associated frame plate 22 by means of a bolt 87 extending through a vertically disposed guide slot 88 (FIGS. 1, 3 and 5) in the frame side plate 22. Each anchor bolt 82 is attached at its lower end to one end of a tension spring 89. The other end of the spring 89 is secured to a longitudinally extending bar 90 carried on brackets 91 which are mounted on the lower edge of the vertical legs 86 of the brackets 84. A longitudinally extending bumper bar or stop rod 92 is mounted on the inner edges of the inwardly extending bracket legs 85 on the top of which cross bars 65 will rest in the lowermost position. The support brackets 84 which are spaced along the length of the frame plate 22 are adjustably positioned vertically by means of adjusting bolts or screws 93 having a threaded lower section extending through a threaded aperture 94 in the leg 85 of the angle bracket 84. The adjusting screw 93 is rotatably mounted at 96 on the inwardly extending leg 97 of a mounting bracket 98 of the same character as the bracket 81 on the other side of the machine and mounted on the frame plate 22 in the same fashion. With this arrangement the individual cross bars 65 and the pad or plate members 14 which they carry are individually spring-pressed in the direction of the rollers 12 so that an egg advancing into the machine on the rollers 12 and rotated by turning of the latter will be subject to pressure applied by the pad members 14 and the shell will be fractured by the pressure and divided into at least two portions.

The next group 61 of plate or pad members and also the following groups or assemblies 62 and 63 each comprise a plurality of pad members 18 which are of the same character as the pad members 14 except that they do not have the cutting element 15 on the egg engaging bottom face. The pad members 18 are mounted in the same manner as pad members 14 and their smooth faces frictionally engage the egg surfaces without any indentation or damaging of the egg bodies which will be exposed to contact with these surfaces. The assemblies 60, 61 and 62 are spaced longitudinally along the machine so as to permit the eggs carried on the conveyor run 24 to be subject to a liquid flushing operation as they advance across the space or gap between each group or assembly of the pad members and the next assembly thereof. The liquid for flushing the surface of the eggs which initially wets the shell and the connecting membrane and subsequently flushes off shell fragments which may cling to the egg body is supplied through relatively short lengths of pipe or conduit which form nozzles 16, 101, 102, 103 and 104. The nozzles 16, 101, 102, 103 and 104 depend from a manifold 105 extending longitudinally of the machine above the plane of the pad assemblies 60, 61, 62 and 63. The first nozzle 16 is located at the entrance to the first assembly 60 of the pad members while the nozzles 101, 102 and 103 are located in the gaps between the assemblies 60, 61; 61, 62 and 62, 63, the spacing between the assemblies being sufficient to relieve the pressure on each successive egg and to accommodate the liquid flushing nozzle. The pad assemblies 61, 62 and 63 are identical and the assemblies are spaced from each other a sufficient distance to accommodate the nozzles which aid in separating the shell portions from the egg bodies. The nozzles 104 extend in spaced relation from the last pad assembly 63 to the discharge end of the machine so as to insure that all shell fragments are cleared from the egg bodies. The manifold 105 is supplied with liquid for application to the eggs through a conduit 106 running from a pump 107 which draws the liquid from a supply tank 108 at the bottom of the frame 20. The tank 108 is provided in its top surface with a suitable filter pad or element indicated at 110 to enable the fluid to be maintained in a clean and sanitary condition and permit recycling of the same.

The shell collecting conveyor 25 is mounted below the conveyor 10 and may be a slat type or wire or belt type conveyor onto which the shell portions are dumped as they are loosened and freed from the eggs by application of the pressure exerted through the plate assemblies and flushing with liquid which aids in loosening the shell particles and insures removal of all of the same as the eggs pass through the machine. Inwardly tapering or slanted plate members 111 extend longitudinally on the side wall frame plates 22 and 23 which funnel the shell pieces onto the top run of the conveyor 26 and inwardly slanted plate members 112 at the bottom of the side plates 22 and 23 direct the liquid into the top of the tank 110.

The shell collecting conveyor 25 is mounted on end rollers 113 and 113' carried on cross shafts 114 and 115, with the shaft 115 being mounted in the side frame plates 22 and 23 and provided with a tension control device 116. The shaft 114 at the discharge end of the machine is journaled in support bracket 117 carried on the side plate 22 and is provided at one end with a driving sprocket 118 for a drive chain 120 which is powered by the sprocket 121 on a drive motor 122 supported on suitable brackets at the one side of the machine. The chain 120 also drives the shaft 33 of the upper egg supporting conveyor 10 through a sprocket 123 on the end of the shaft 33.

At the discharge end of the machine there may be provided a suitable conveyor 124 for receiving the shelled eggs. At the entrance end of the machine a suitable supply conveyor 125 may be provided and an accumulator (not shown) may be employed, if desired, so as to keep the machine fully supplied with the eggs to be shelled.

In the use of the machine the elevation of the cross bars 65 may be adjusted initially with predetermined tension in the springs 90 to accommodate eggs which vary between two commonly recognized USDA sizes and the pressure applied by the pad members 14 and 18 will be sufficient to separate the shell portions from the egg bodies as they are rolled on the conveyor 10 beneath the pads, with some assistance from the flushing of the eggs with a suitable liquid as they advance through the machine. The devation of the pad members 14 and 18 may be adjusted without changing the spring tension on the pad supporting bars 65 so as to accommodate eggs or larger of smaller size.

Operation of the machine will be apparent from the foregoing description. The hard cooked eggs will be fed to the entrance end of the conveyor 10 from the conveyor 125 with the eggs being received in the pocket forming roller recesses 40 in the top run 24 of the conveyor 10 and rotated about the long axis as they pass beneath the first flushing nozzle 16 and under the pressure pads 14 of the first pad assembly 60 where initial shell crushing occurs. As the eggs are advanced on the conveyor run 24 beneath successive groups of pad members 18 the shell is crushed and fragments drop or are flushed loose so as to fall down onto the top run 26 of the shell conveyor 25 which carries them from the machine. The eggs pass beneath successive flushing nozzles 104 and any remaining shell fragments are washed off the egg bodies as they are advanced on the conveyor 10 to the discharge end of the machine.

We claim:

1. A hard cooked egg shelling machine comprising a roller conveyor disposed in a supporting frame with the rollers shaped and spaced so as to provide egg accommodating pockets between each roller and the next succeeding roller, the conveyor having a horizontally disposed run on which the eggs are carried and rotated about their long axes, a series of pressure applying pad members spaced above said conveyor run so that they apply predetermined pressure to eggs rolling beneath the same, certain of said pressure applying pad members having means on the egg engaging bottom face for crushing each shell on a circumferential line, and nozzles associated with said pressure applying pad members for flushing the eggs with a liquid so as to assist in the release of the crushed shell portions from the eggs and discharge the shell portions from the machine.

2. A hard cooked egg shelling machine comprising a conveyor disposed in a supporting frame with means providing egg accommodating pockets, the conveyor having a horizontally disposed run on which the eggs are carried for rotation about their long axes, pressure applying members spaced above said conveyor run so that they apply sufficient pressure to crush portions of the shells on eggs rolling beneath the same, certain of said pressure applying members having means on the egg engaging bottom face for crushing each shell on a circumferential line so as to cause the shell to separate into portions, and means associated with said pressure applying members for flushing the eggs with a liquid so as to assist in the release of the crushed shell portions from the eggs.

3. A machine for shelling hard cooked eggs comprising a traveling conveyor disposed so as to provide a generally horizontal run with egg accommodating pockets in which the eggs are carried with the long axes extending tranversely of the path of advance, said pockets being constructed so that the eggs are supported for rotation therein about their long axes, and pad members arranged above said horizontal conveyor run and spaced from said conveyor run so that eggs carried in the pockets of said conveyor run will engage the bottom faces of said pad members and roll in said pockets in pressure contact with said pad members, whereby the shells will be crushed sufficiently around the central portions of the eggs to cause the crushed shell particles to be separated from the egg bodies.

4. A machine as set forth in claim 3 wherein said conveyor comprises a series of chain carried cross bars having roller sections thereon which are spaced in the direction lengthwise of the conveyor so as to provide pocket forming egg supporting areas between said roller sections.

5. A machine as set forth in claim 3 wherein said conveyor comprises a plurality of endless chain carried cross bars having egg supporting spool members mounted thereon which are constructed and aligned to provide pockets for supporting eggs so that they may rotate in the pockets and about the long axes thereof.

6. A machine as set forth in claim 5 wherein said egg supporting spool members each have a peripheral recess which forms with a like recess in an adjacent spool member an egg accommodating pocket.

7. A machine as set forth in claim 6 wherein said egg supporting spool members have track forming end portions and friction pads mounted along said conveyor run on which said end portions ride so as to rotate the spool members as the conveyor advances and thereby rotate the eggs in the pockets.

8. A machine as set forth in claim 3 wherein said pad members are resiliently mounted so as to apply sufficient predetermined pressure on the eggs rolling beneath the same on said conveyor to crush the shells.

9. A machine as set forth in claim 3 wherein said pad members have associated means for flushing the eggs with a fluid to assist in loosening the crushed shell particles from the egg bodies.

10. A machine as set forth in claim 3 wherein means is provided on the pad members to apply sufficient pressure to the middle portion of each egg, as the egg contacts the pad members, to compress the middle portion of the egg and thereby cause the egg body to elongate and move end portions of the egg shell which have been released by the crushing outwardly along the long axis of the egg.

11. A machine as set forth in claim 3 wherein said pad members are mounted on cross bars which are pivoted at one end and spring urged at the other end so as to apply sufficient resilient pressure to the eggs passing beneath said pad members to crush portions of the egg shells and permit their release from the egg bodies.

12. A machine as set forth in claim 3 wherein certain of said pad members have rib formations on the egg contacting faces which extend in the direction of travel of said conveyor run so as to crush the egg shells on a circumferential line and thereby permit separation of shell portions in opposite directions along the long axis of the egg.

13. A machine as set forth in claim 3 wherein said pad members are spaced along said conveyor run and means is provided between certain of said pad members for flushing the eggs with a fluid to assist in loosening and removing shell fragments resulting from crushing the shells against said pad members.

14. A machine for shelling hard cooked eggs comprising a conveyor disposed so as to provide a generally horizontal run with egg accommodating pockets in which the eggs are carried so as to be rotatable about their long axes, and pad members arranged along said horizontal conveyor run and spaced from said conveyor run so that eggs carried on said conveyor run will roll in pressure contact with said pad members and the shells will be crushed sufficiently to permit release of the crushed shell particles from the egg bodies, said pad members being arranged in spaced groups along said horizontal conveyor run and means provided between the groups of said pad members for flushing the eggs with a fluid to assist in separating the crushed shell particles from the egg bodies.

15. A machine for shelling hard cooked eggs comprising a conveyor disposed with a run thereof generally horizontal and having egg accommodating pockets in which the eggs are carried so as to be rotatable about their long axes, egg contacting members arranged along said conveyor run and spaced above said conveyor run so that eggs advanced on said conveyor run roll in pressure contact with an egg engaging face on said egg contacting members, said egg contacting members having means on the egg engaging face thereof for crushing the shell on a peripheral line so as to cause each shell to divide into portions in the vicinity of the center of the egg, and fluid discharge means mounted for co-operation with said egg contacting members so as to flush the eggs with a fluid and thereby assist in the release of the shell portions from the eggs.

16. A machine as set forth in claim 15 wherein said egg contacting members are in the form of a series of pad forming plate members arranged in spaced groups along said conveyor run.

17. A machine as set forth in claim 15 wherein said egg contacting members comprises generally rectangular plates mounted on cross bars with the plates having the bottom faces disposed in a plane above said conveyor run and spaced therefrom so as to be contacted in rolling relation by said eggs.

18. A machine as set forth in claim 17 wherein said plates are individually mounted with each of said plates having means for applying resilient pressure upon eggs on said conveyor run and contacting said plates in rolling relation.

19. A machine as set forth in claim 15 wherein certain of said egg contacting members have egg engaging faces confronting said conveyor run and a rib forming member positioned thereon which constitutes said means for crushing the egg shells on a peripheral line so as to permit portions of the shells to break away and move out along the ends of the long axes of the eggs.

20. A machine as set forth in claim 15 wherein said fluid discharge means comprises fluid nozzles spaced along said horizontal conveyor and positioned to direct fluid onto the eggs on said conveyor run.

21. A machine as set forth in claim 20 wherein one of said nozzles is disposed at the entrance end of said conveyor run.

22. A machine as set forth in claim 20 wherein said nozzles depend from a common supply conduit and means is provided beneath said egg supporting conveyor run for collecting discharged fluid having a connecting line to said common supply conduit for recirculating said fluid.

23. A machine as set forth in claim 15 wherein a shell fragment collecting conveyor is disposed beneath said egg carrying conveyor run.

24. A machine as set forth in claim 15 wherein said egg contacting members are mounted on cross bars which are supported for adjustment toward and from said egg carrying conveyor run.

25. A machine for shelling hard cooked eggs comprising a conveyor disposed with a run thereof generally horizontal and having egg accommodating pockets in which the eggs are carried so as to be rotatable about their long axes, egg contacting members arranged along said conveyor run and spaced above said conveyor run so that eggs on said conveyor run may roll in pressure contact with the same, said egg contacting members being in the form of relatively small plate members which are mounted on pivoted cross bars with their bottom faces confronting said conveyor run and spaced therefrom in a substantially common plane, said cross bars being spring urged so as to apply predetermined pressure to eggs passing beneath said plate members, said egg contacting members having means on the egg engaging face thereof for crushing the shell on a peripheral line so as to cause each shell to divide into portions in the vicinity of the center of the egg, and fluid discharge means associated with said egg contacting members for flushing the eggs with a fluid so as to assist in the release of the shell portions from the eggs.

26. A method of shelling a hard cooked egg which comprises supporting the egg in the pocket of a traveling conveyor so as to roll the egg about its longitudinal axis and against the surface of a plate member spaced from the conveyor path with predetermined pressure sufficient to crush the egg shell on a cicumferential line and distort the egg body thereby forcing the shell portions outwardly of the egg body and directing a fluid onto the egg body to aid in loosening shell portions and in removing the shell portions from the egg body.

27. A method of shelling a hard cooked egg as set forth in claim 26 and flushing the egg with a fluid prior to rolling the egg along the surface of the plate member so as to initially soften the shell and the connecting membrane and thereby aid in subsequent release and separation of the shell from the egg body.

28. A method of shelling a hard cooked egg as set forth in claim 26 wherein the plate member has a rib formation on the egg contacting surface.

* * * * *